(12) United States Patent
Ordonez

(10) Patent No.: US 7,349,914 B1
(45) Date of Patent: Mar. 25, 2008

(54) METHOD AND APPARATUS TO CLUSTER BINARY DATA TRANSACTIONS

(75) Inventor: Carlos Ordonez, San Diego, CA (US)

(73) Assignee: NCR Corp., Dayton, OH (US)

( * ) Notice: Subject to any disclaimer, the term of this patent is extended or adjusted under 35 U.S.C. 154(b) by 481 days.

(21) Appl. No.: 10/838,475

(22) Filed: May 4, 2004

(51) Int. Cl.
*G06F 17/00* (2006.01)

(52) U.S. Cl. .................. 707/101; 707/102; 707/103 R; 707/104.1

(58) Field of Classification Search .............. 707/1–10, 707/100–104.1, 200–206
See application file for complete search history.

(56) References Cited

U.S. PATENT DOCUMENTS

| | | | |
|---|---|---|---|
| 6,012,058 A * | 1/2000 | Fayyad et al. .................. 707/6 |
| 6,374,251 B1 | 4/2002 | Fayyad et al. .............. 707/101 |
| 6,567,936 B1 * | 5/2003 | Yang et al. .................... 714/37 |
| 6,581,058 B1 | 6/2003 | Fayyad et al. .................. 707/6 |

OTHER PUBLICATIONS

R. Agrawal, et al., "Fast Algorithms for Projected Clustering," ACM SIGMOD Conference, pp. 61-72 (1999).
R. Agrawal, et al., "*Fast Algorithms for Mining Association Rules*" ACM SIGMOD Conference, pp. 1-32 (1999).
C. Aggarwal, et al., "*Finding generalized projected clusters in high dimensional spaces*" ACM SIGMOD Conference, p. 1-12 (2000).
R. Agrawal, et al., "*Automatic Subspace Clustering of High Dimensional Data for Data Mining Applications*" ACM SIGMOD Conference, pp. 1-12 (1998).
R. Agrawal, et al., "*Mining Association Rules Between Sets of Items in Large Databases*" ACM SIGMOD Conference, pp.1-10 (1993).
P.S. Bradley, et al., "*Scaling Clustering Algorithms to Large Databases*" ACM KDD Conference, pp. 1-7 (1998).
M. M. Breunig, et al., "*Data Bubbles: Quality Preserving Performance Boosting for Hierarchical Clustering*" ACM SIGMOD Conference, pp. 1-12 (2001).
F. Farnstrom, et al., "Scalability for Clustering Algorithms Revisited" SIGKDD Explorations, 2(1):1-7 (Jul. 2000).
B. Fritzke, "The LBG-U method for vector quantization—an improvement over LBG inspired from neural networks" Neural Processing Letters, 5(a):1-9 (1997).
V. Ganti, et al., "CACTUS—Clustering Categorical Data Using Summaries" ACM KDD Conference, pp. 1-11 (1999).
S. Guha, et al., "Clustering Data Streams" FOCS, pp. 1-8 (2000).
S. Guha, et al., "CURE: An Efficient Clustering Algorithm for Large Databases" SIGMOD Conference, pp. 1-10 (1998).
S. Guha, et al., "ROCK: A Robust Clustering Algorithm for Categorical Attributes" ICDE Conference, pp. 345-352 (2000).

(Continued)

*Primary Examiner*—Isaac Woo
(74) *Attorney, Agent, or Firm*—Trop, Pruner & Hu, P.C.

(57) ABSTRACT

A database system is capable of clustering data in received transactions. Clustering is based on sparse distance computations and/or simplified sufficient statistics. Each of the received transactions contain attributes or dimensions that are binary data. In some implementations, a summary table is also output to enable convenient viewing of the results of clustering.

13 Claims, 3 Drawing Sheets

OTHER PUBLICATIONS

J. Han, et al., "Mining frequent patterns without candidate generation" ACM SIGMOD Conference, pp. 1-3 (2000).

A. Hinneburg, et al.; "Optimal Grid-Clustering: Towards Breaking the Curse of Dimensionality in High-Dimensional Clustering" VLDB Conference, pp. 1-12 (1999).

L. O'Callaghan, et al., "Streaming-Data Algorithms For High-Quality Clustering" IEEE ICDE, pp. 1-25 (2001).

C. Ordonez, et al., "FREM: Fast and robust EM clustering for large data sets" ACM CIKM Conference, pp. 1-12 (2002).

C. Ordonez, et al., "A Fast Algorithm to Cluster High Dimensional Basket Data" IEEE ICDM Conference, pp. 1-4 (2001).

S. Roweis, et al., "A Unifying Review of Linear Gaussian Models" Neural Computation, pp. 305-345 (1999).

M. Sato, et al.,"On-line EM Algorithm for the Normalized Gaussian Network" Neural Computation 12(2), pp. 1-24 (2000).

T. Zhang, et al., "BIRCH: An Efficient Data Clustering Method for Very Large Databases" ACM SIGMOD Conference, pp. 103-114 (1996).

P.S. Bradley, et al; "Refining Initial Points for K-Means Clustering" 15th Int'l Conf. On Machine Learning, pp. 91-99 (1998).

C. Ordonez, "Clustering Binary Data Streams with K-Means" 8th ACM SIGMOD Workshop DMKD 2003, pp. 12-19 (Jun. 13, 2003).

\* cited by examiner $$W = \begin{bmatrix} 0.40 \\ 0.05 \\ 0.20 \\ 0.35 \end{bmatrix} \quad C = \begin{matrix} & 1 & 2 & 3 & 4 \\ 1: beer & 0.12 & 0.80 & 0.09 & 0.21 \\ 2: bread & 0.95 & 0.21 & 0.45 & 0.78 \\ 3: coffee & 0.69 & 0.14 & 0.02 & 0.16 \\ 4: crackers & 0.31 & 0.87 & 0.50 & 0.07 \\ 5: ham & 0.21 & 0.89 & 0.21 & 0.14 \\ 6: jelly & 0.83 & 0.12 & 0.25 & 0.11 \\ 7: magazine & 0.11 & 0.09 & 0.03 & 0.03 \\ 8: meat & 0.02 & 0.11 & 0.13 & 0.99 \\ 9: milk & 0.91 & 0.45 & 0.77 & 0.23 \\ 10: notebook & 0.02 & 0.56 & 0.45 & 0.07 \\ 11: oil & 0.21 & 0.11 & 0.56 & 0.70 \\ 12: produce & 0.43 & 0.05 & 0.82 & 0.21 \\ 13: salsa & 0.25 & 0.01 & 0.21 & 0.11 \\ 14: soda & 0.10 & 0.61 & 0.70 & 0.07 \\ 15: water & 0.16 & 0.27 & 0.88 & 0.09 \\ 16: wine & 0.01 & 0.08 & 0.12 & 0.13 \end{matrix}$$

| $i$ | $W_j$ | $C_j$ (frequent dimensions) | Outliers (odd transactions) |
|---|---|---|---|
| 1 | 40% | 90-100%: bread milk 80-90%: jelly | {jelly wine notebook} |
| 2 | 5% | 80-90%: beer crackers ham | {crackers sauce} |
| 3 | 20% | 80-90%: produce water 70-80%: milk soda | {water coffee} |
| 4 | 35% | 90-100%: meat 80-90%: bread 70-80%: oil | {bread magazine} |

FIG. 3

METHOD AND APPARATUS TO CLUSTER BINARY DATA TRANSACTIONS

BACKGROUND

A database is a collection of logically related data arranged in a predetermined format, such as in tables that contain rows and columns. As the technology of storage devices and database software have improved, the capacity of database systems have also increased dramatically. An application of database systems is data warehousing, where data from various sources are collected and stored in the data warehouse. The amount of data that can be stored in the data warehouse can be immense.

Data can be input into a database system on a substantially continuous basis (in which the input data arrives as a substantially continuous stream at the database system). One technique performed with the input data to be stored into a database system is clustering. Clustering involves partitioning a data set into disjoint groups such that points in the same group are similar to each other according to some similarity metric. Clustering can be performed on numeric data or categorical data. Numerical data refers to data that can be assigned a metric measure, such as height, scale, volume, and so forth. Categorical data is data that has a finite number of values not represented by a measure. Examples of categorical data include city, state, gender, and so forth.

Clustering techniques may not always produce accurate results. For example, conventional clustering techniques may not properly handle data sets that have skewed data distributions or have large amounts of "outliers," which are data values of the data set that do not belong to any specific cluster. Also, conventional clustering techniques may have high dependence on initialization, which means that improper initialization may cause the clustering technique to produce inaccurate results. Also, conventional clustering techniques may exhibit convergence to poor solutions.

SUMMARY

In general, methods and apparatus are provided to cluster a data set that is based on sparse distance computations and/or simplified statistics of each cluster.

According to one implementation, a method of clustering data includes receiving transactions for a data set, each transaction having plural attributes. The method further includes computing distances between a null transaction and centroids of clusters, each of the attributes of the null transaction have a zero value. The clusters of the data set are determined based at least in part on the computed distances between the null transaction and centroids of clusters.

In another implementation, a storage medium contains instructions that when executed cause a system to perform a K-means clustering technique on input data, perform sparse distance computations and sparse matrix computations in the K-means clustering technique, and define clusters as a result of the K-means clustering technique using sparse distance computations and sparse matrix computations.

Other or alternative features will become more apparent from the following description, from the drawings, or from the claims.

BRIEF DESCRIPTION OF THE DRAWING

FIG. 3 illustrates example matrices and a summary table generated by the process of clustering data of FIG. 2.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

I. Database System Environment

Figure 1:
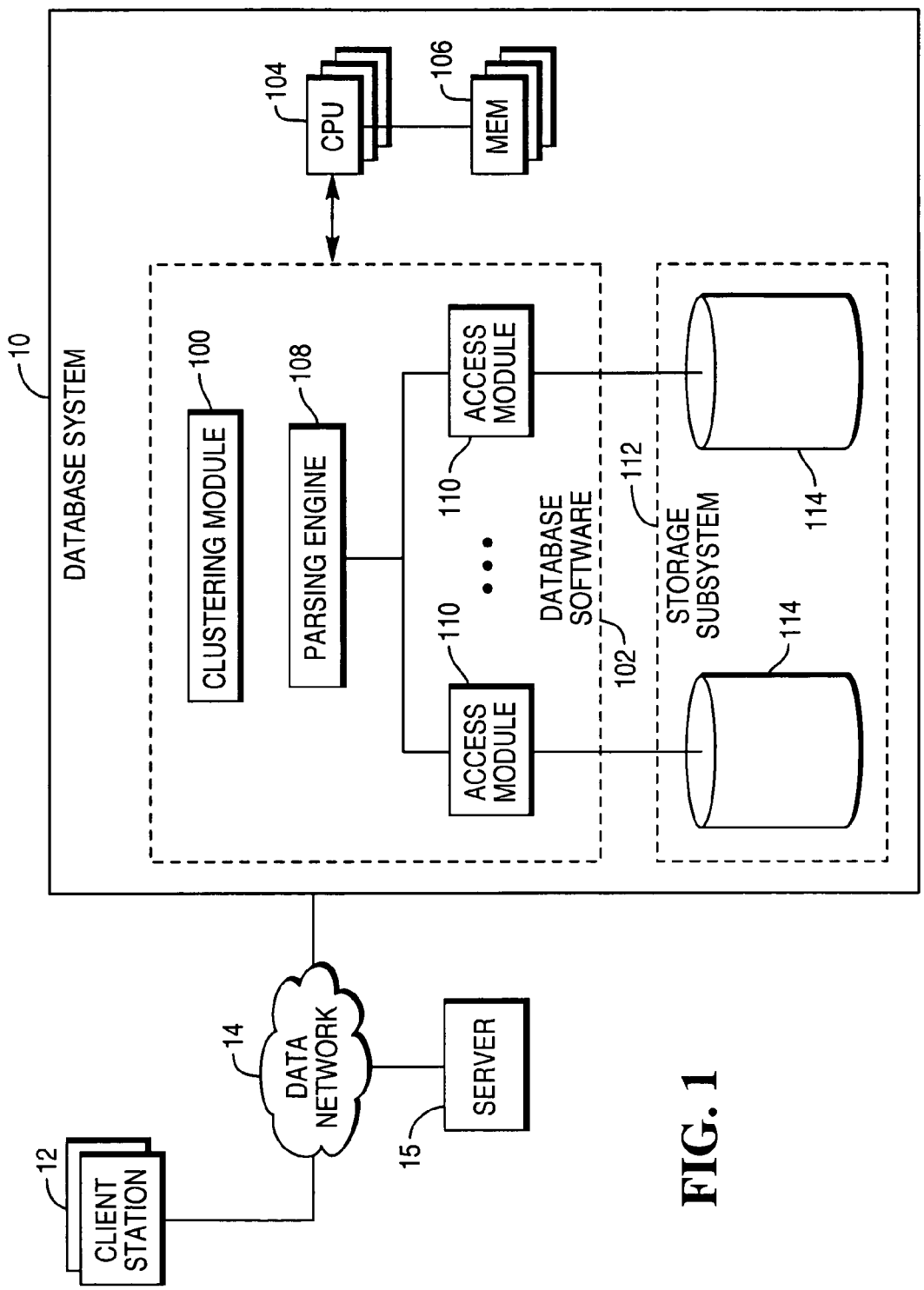
FIG. 1 is a block diagram of an example arrangement that includes a database system coupled to one or more client stations, where the database system has a clustering module according to some embodiments of the invention.

FIG. 1 illustrates an example arrangement of a database system 10 that includes a clustering module 100 capable of performing clustering techniques according to some embodiments. In some implementations, the clustering techniques include K-means clustering techniques. The clustering module 100, in the illustrated embodiment, is part of database software 102 that is executable on one or more central processing units (CPUs) 104 in the database system. The one or more CPUs 104 are connected to memories 106.

The clustering module 100 is invoked to cluster a data set, which can either be located in one or more tables in the database system 10 or be provided as a flow or stream of input data to the database system 10. In one implementation, data associated with transactions are loaded by client stations 12 over a data network 14 to a server 15. The clustering module 100, when invoked, accesses the server 15 in one of several ways: (1) by accessing disk blocks on the server directly; (2) by transferring data on a channel where rows are being loaded; and (3) through one or more queries, such as Structured Query Language (SQL) queries.

The database software 102 also includes one or more parsing engines 108 and access modules 110. The database system 10 in accordance with one embodiment of the invention is a parallel database system that includes multiple access modules 110 for concurrent access of data stored in a storage subsystem 112. The storage subsystem 112 includes plural storage modules 114 that are accessible by respective access modules 110.

Each access module 110 is capable of performing the following tasks: insert, delete, or modify contents of tables stored in respective storage modules 114; create, modify or delete the definitions of tables; retrieve information from definitions and tables; and lock databases and tables. In one example, the access modules 110 are based on access module processors (AMPs) used in some TERADATA® database systems from NCR Corporation.

The parsing engine 108 in the database software 102 includes a parser that receives a query (e.g., an SQL query) from a user interface, such as a user interface in a client station 12 coupled to the database system 10 over a network 14. A selected access or query plan for the received query contains steps that are to be performed by the access modules 110. In response to these steps, the access modules 110 perform operations on data or data structures (e.g., tables, views, and so forth) stored in the storage modules 114 in the storage subsystem 112. If performing clustering is desired, then the clustering module 100 is called by the access modules 110 for performing the clustering. Note that multiple instances of the clustering module 100 can be invoked by the multiple access modules 110.

According to some embodiments, the clustering performed by the clustering module 100 is a K-means clustering algorithm to cluster binary data streams. A binary data stream can be used to represent categorical data, which is data that has a finite number of values. An example of categorical data includes data relating to the purchase of items in a grocery store. Such categorical data points include bread, coffee, crackers, ham, jelly, and so forth. Each of the data points can have one of two binary values: "0" or "1." If a data point (such as bread) has a "1" value, then that is an indication the corresponding item (bread) was purchased in a particular transaction. On the other hand, if the data point (such as bread) has a "0" value, then that is an indication the item corresponding (bread) was not purchased in a transaction.

One characteristic of certain binary data sets is that they are sparse. A sparse binary data set is a set that has a relatively small percentage of data points with a binary "1" value. In performing K-means clustering, calculation of Euclidean distances is performed. According to some embodiments, to perform clustering of a sparse binary data set, sparse distance computation (which is more efficient than conventional distance computations) is performed by the clustering module 100. In addition to performing sparse distance computation, the clustering module 100 also employs simplified sufficient statistics for the binary data set, to improve clustering efficiency. Also, optionally, the clustering module 100 maintains a summary table of clustering results to show frequent binary values and outlier values. The summary table enables users to be able to conveniently and quickly view the result of clustering of the sparse binary data set.

II. Definitions of Data Structures for K-Means Clustering

The inputs to the K-means clustering module 100 are: (1) a data set D having n d-dimensional points, and (2) k, the desired number of clusters. A d-dimensional point refers to a data structure having d dimensions. For example, each d-dimension point can be part of a transaction that has d attributes. In a grocery store example, a transaction is defined as a purchase made by a given customer, where each customer can purchase any number of items carried by the grocery store. Each of such items is identified as a dimension or attribute, where each dimension or attribute can have either a binary "0" value (to indicate that the customer did not purchase the particular item) or a "1" value (to indicate that the container did purchase a particular item).

The output of the K-means clustering module 100 includes three matrices: C (containing the means or probability of occurrence of each dimension in each cluster), R (containing squared distances), and W (containing the weights for each cluster). The output produce by the clustering module 100 also includes a partition of D into k subsets and a measure of cluster quality. Matrices C and R are d×k matrices and matrix W is a k×1 matrix. In the following discussion, for manipulating matrices, the following convention for subscripts is used. When referring to transactions, the variable i is used, where $i \in \{1, 2, \ldots, n\}$. The variable i alone refers to transaction i, whereas $i_j$ refers to item j in the transaction i. For cluster number, the variable j is used, where $j \in \{1, 2, \ldots, k\}$. Also, reference is made to variable l, where $l \in \{1, 2, \ldots, d\}$. $D_1, D_2, \ldots, D_k$ refer to the k subsets of the data set D induced by clusters such that $D_j \cap D_j' = \emptyset$ for $j \neq j$ ... To refer to a column of C or R, the j subscript (e.g., $C_j$, $R_j$) is used. $C_j$ and $R_j$ refer to the jth cluster centroid and jth variance matrix, respectively, and $W_j$ is the jth cluster weight. The diag[ ] notation is used as a generic operator to obtain a diagonal matrix from a vector, or to consider only the diagonal of a matrix, or to convert the diagonal of a matrix into a vector.

The matrix C is a d×k matrix, with each element $C_{lj}$ (l=1 to d, j=1 to k) of the matrix C containing a percentage indicating probability of occurrence of attribute or dimension l in cluster k As noted above, the K-means clustering algorithm calculates a Euclidean distance. The distance from $t_i$ (transaction i) to $C_j$ (jth cluster centroid) is $$\delta(t_i, C_j) = (t_i - C_j)^t (t_i - C_j). \quad \text{(Eq. 1)}$$

Let $S = [0, 1]^d$ be a d-dimensional Hamming cube. Let $D = \{t_1, t_2, \ldots, t_n\}$ be a database of n points in S. The structure $t_i$ is a binary vector (treated as a transaction). Matrix D is a d×n sparse binary matrix. Let $T_i = \{l | D_{li} = 1, l \in \{1, 2, \ldots, d\}, i \in \{1, 2, \ldots, n\}\}$. $T_i$ is the set of non-zero coordinates of $t_i$; $T_i$ can be understood as a transaction or an item set to be defined below. When expressed by $T_i$, the input data set D becomes a stream of integers indicating dimensions equal to 1 separated by an end of transaction marker. Processing $T_i$ instead of $t_i$ allows computations to be performed just with the dimensions having the "1" binary value, so that dimensions having the "0" binary value do not have to be processed to conserve computation bandwidth. Since transactions are sparse vectors, $|T_i| << d$ (that is, the number of points in $T_i$, transaction i containing only dimensions having the "1" binary value, is much less than the value of d, which represents the total number of dimensions in each transaction $t_i$). This fact will be used to develop an efficient sparse distance computation, described further below. T is used to denote average transaction size $$\left( T = \sum_{i=1}^{n} |Ti| / n \right).$$

III. The K-Means Clustering Algorithm

The K-means clustering algorithm is initialized with some random or approximate solution. Each iteration assigns each point to its nearest cluster and then points belonging to the same cluster are averaged to get new cluster centroids. Each iteration successively improves cluster centroids until they become stable. Formally, the problem of clustering is defined as finding a partition of D into k subsets such that $$\sum_{i=1}^{n} \delta(t_i, C_j) \quad \text{(Eq. 2)}$$

is minimized, where $C_j$ is the nearest cluster centroid of $t_i$. The quality of a clustering model is measured by the sum of squared distances from each point to the cluster where it was assigned. This quantity is proportional to the average quantization error, also known as distortion. The quality of a solution is measured as:

$$q(C) = \frac{1}{n} \sum_{i=1}^{n} \delta(t_i, C_j), \quad \text{(Eq. 3)}$$

which can be computed from R as $$q(R, W) = \sum_{j=1}^{k} W_j \sum_{i=1}^{d} R_{ij}.$$ (Eq. 4)

IV. Embodiments of K-Means Clustering Algorithm

To increase the processing speed of the K-means clustering algorithm according to some embodiments, sparse distance computation and simplified sufficient statistics are used. Sparse distance computation involves calculating sparse distances between the null transaction (zeroes on all dimensions) and each of the centroids $C_j$. Then only differences for non-null dimensions of each transaction are computed to determine cluster membership as transactions are being read. If D is a sparse matrix and d (number of dimensions) is high, a conventional distance formula (Eq. 1 above) is expensive to compute. In sparse distance computation, the clustering module 100 precomputes a distance from every centroid $C_j$ to the null vector $\overline{O}$ (representing the null transaction). A k-dimensional vector $\Delta$ is defined that contains respective distances between the null vector $\overline{O}$ and each $C_j$: $\Delta_j = \delta(\overline{O}, C_j)$. Based on $\Delta$, the Euclidean distances can be computed as:

$$\delta(t_i, C_j) = \Delta_j + \sum_{l=1,(ti)l\neq 0}^{d} ((t_i)_l - C_{lj})^2 - C_{lj}^2.$$ (Eq. 5)

The Eq. 5 computation substantially improves performance, but it does not affect result accuracy. A similar idea is applied to update clusters, as described in more detail below.

Typically, the K-means clustering algorithm uses sufficient statistics to improve processing speed. Sufficient statistics are summaries of $D_1, D_2, \ldots, D_k$ represented by three matrices M, Q, N. M contains a sum of points in each cluster, Q contains a sum of squared points in each cluster, and N contains a number of points per cluster. In accordance with an embodiment, sufficient statistics is simplified for clustering binary data. Sufficient statistics for clustering binary vectors are simpler than sufficient statistics required for clustering numeric data, as described below.

Let D be a set of n transactions of binary data, and $D_1, D_2, \ldots, D_k$ be a partition of D. Then the simplified sufficient statistics required for computing the matrices C, R, and W are only N and M (Q can be omitted). Q can be omitted because the sum of the squared of binary values (contained in Q) is equal to the sum of binary values (contained in M). As a result, Q=M. Therefore, only N and M are needed to calculate the matrices C, R, and W for a binary matrix D.

A consequence of the previous lemma is that the matrix R can be computed from C without scanning D or storing Q. Moreover, the above lemma makes it possible to reduce storage requirements for the N, M, and Q matrices by about half, since Q does not have to be stored, and N is usually much smaller in size than M.

M is a d×k matrix, where $M_j = \Sigma_{\forall_{ti} \in D_j} t_i$. N is k×1 matrix, where $N_j = |D_j|$. The updated formulas for C, R, W are then expressed as follows:

$$C_j = \frac{1}{N_j} M_j,$$ (Eq. 6)

$$R_j = diag[C_j] - C_j C_j^t, \text{ and}$$ (Eq. 7)

$$W_j = \frac{N_j}{\sum_{j'=1}^{k} N'_{j'}}$$ (Eq. 8)

As shown by Equations 6-8, the matrices C, R, and W can be computed using the sufficient statistics matrices N and M, without using Q.

Figure 2:
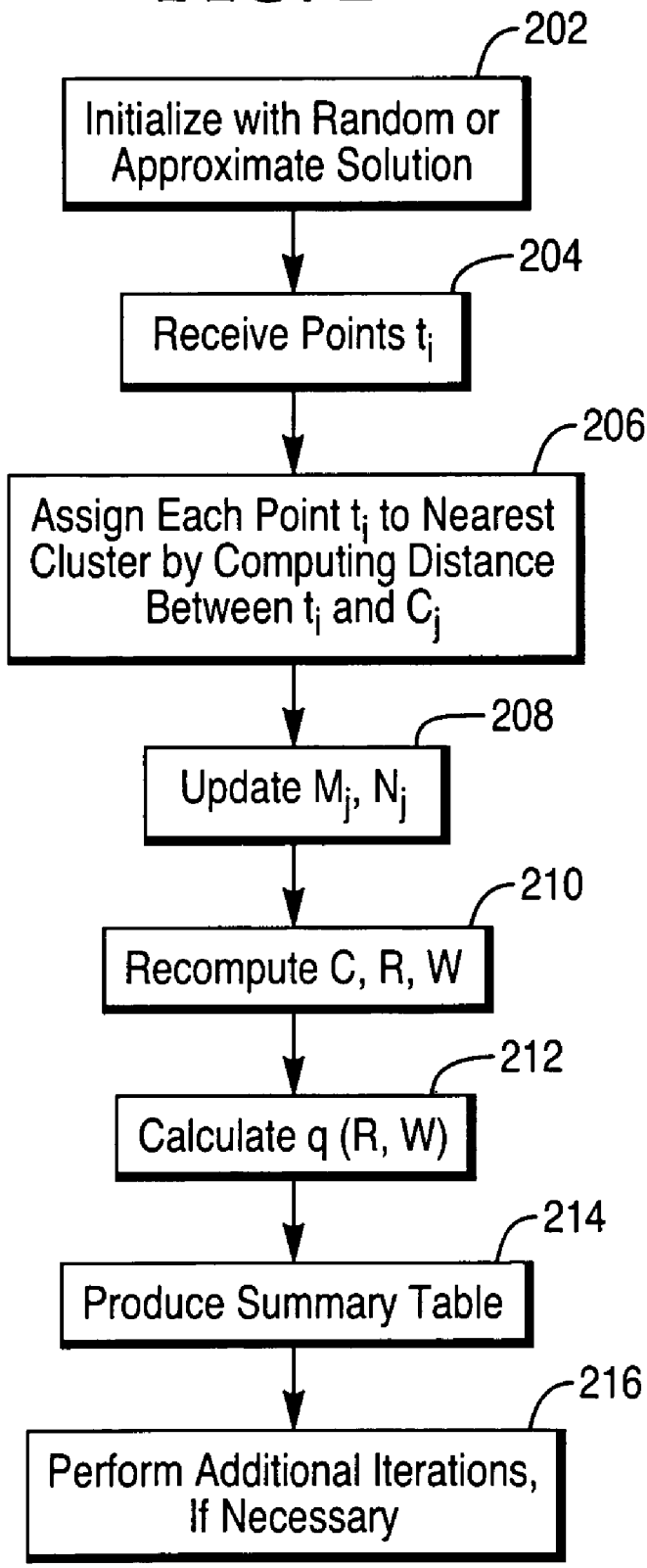
FIG. 2 is a flow diagram of a process of a clustering data set according to an embodiment in the database system of FIG. 1.

FIG. 2 illustrates a flow diagram of a process performed by the clustering module 100, in accordance with an embodiment, to process an input data set. The clustering module 100 initializes a K-means clustering algorithm with a random or approximate solution (at 202). Next, the clustering module 100 receives (at 204) points $t_i$ (transactions). Each point $t_i$ is assigned (at 206) by the clustering module 100 to a nearest cluster by computing distance between $t_i$ and each centroid $C_j$. The distance computation performed at 206 is a sparse distance computation according to Eq. 5.

Once each point $t_i$ is assigned to a nearest cluster, the clustering module 100 updates (at 208) the matrices $M_j$ and $N_j$. Once $M_j$ and $N_j$ are updated, the matrices C, R, and W are recomputed using Eqs. 6, 7, and 8, respectively. Also, the quality of the solution is computed (at 212) using the updated values of R and W (see Eq. 4 above). Also, a summary table G is produced (at 214) by the clustering module 100. The content of the summary table G contains a summary of the content of the matrices C and W, along with "outlier" data (which is data that does not really belong to any particular cluster). The summary table G is discussed further below.

Next, if applicable, additional iterations (acts 204-214) are repeated (at 216) until cluster centroids become stable. Whether iterations are performed depends upon the type of K-means clustering algorithm employed. Use of the incremental K-means clustering algorithm, as described below, allows clustering to be performed where each point of the input data set is read just once so that repeated reading of process to perform clustering can be avoided.

As noted above, the acts performed at 204-214 provide various benefits. Sparse distance computation performed at 206 for assigning a point (or transaction) $t_i$ to a nearest cluster is a sparse matrix computation that conserves computation bandwidth (since the distance calculated between a point and each cluster is computed based on dimensions of each point $t_i$ having a binary "1" value, with dimensions having "0" binary value not repeated for each distance computation). Also, the calculation of the matrices C, R, and W employs simplified statistics that include the M and N matrices but not the Q matrix. As a result, the Q matrix does not have to be stored, which results in storage savings. Also, by performing computation using M and N but not Q, processing bandwidth is also conserved.

The summary table G that is optionally provided by the clustering module 100 also provides a convenient mechanism for users to quickly ascertain the content of the matrices C and W. Often, the matrix C can be quite large, making it difficult for user to interpret what is contained in C. As discussed further below, the summary table G is relatively small in size and thus does not require a large storage space. Also, because of its small size, the maintenance cost of the summary table G is also relatively small.

The summary table G enables a user to more easily to understand high dimensional binary data. Instead of trying to interpret a d×k matrix (C) containing many entries, a user can use the summary table G to focus on those matrix entries that are more interesting. The summary tale G is explained in the context of an example where d=16, and k=4. Assume items are received in transactions containing integers in $t_i = \{1, \ldots, 16\}$, which represents the 16 dimensions of each point (or transaction) $t_i$. In the present example, each transaction $t_i$ contains items of a grocery store purchased by a customer. In this example, it is assumed that the grocery store contains only 16 items (d=16). These 16 items include: beer, bread, coffee, crackers, ham, jelly, magazine, meat, milk, notebook, oil, produce, salsa, soda, water, and wine (each of this list of items represents a dimension of $t_i$ that can have either a binary "0" or "1" value). Thus, for example, if a dimension (such as bread) of a received transaction $t_i$ has a binary "1" value, then that is an indication that a customer has purchased bread in the transaction. The clustering results for the example grocery store transactions (C, W, and G) are shown in FIG. 3.

In a real database environment in which there are hundreds of product categories or thousands of products, it would be difficult to understand the output matrices C and W. The example summary table is this summary is easier to understand than the matrix C with floating point numbers (representing the probability of occurrence of each dimension in each cluster). Another advantage is that outliers can be seen in the summary table G.

The matrix C shown in FIG. 3 contains four columns (columns 1, 2, 3, 4). Each column corresponds to a cluster. In cluster 1, the percentage of occurrences of a customer purchasing beer is 0.12, or 12%. In cluster 2, the percentage of occurrences of a customer purchasing beer is 0.80, or 80%. In cluster 3, the percentage of occurrences of a customer purchasing beer is 0.09, or 9%. In cluster 4, the percentage of occurrences of a customer purchasing beer is 0.21 or 21%. The weight (expressed in the matrix W) of cluster 1 is 0.40, or 40%. This means that cluster 1 contains 40% of the points of the input matrix D. Similarly, cluster 2 contains 5% of the points of input matrix D, cluster 3 contains 20% of the points of the matrix D, and cluster 4 contains 35% of the points of matrix D, in the example depicted in FIG. 3.

The user specifies a list of cutoff points and a number of top outliers per cluster for the summary table G. These cutoff points uniformly partition cluster centroids $C_j$. The summary table is constructed using the list of cutoff points $c_1$, $c_2, \ldots$, such that $1 \geq c_i > 0$, and a number of desired outliers per cluster $O_j \geq 0$ for cluster j. For each cutoff points $c_i$ there is a (possibly empty) list of dimensions L such that $\ell \in L$ and $c_i > C_{lj} \geq c_i + 1$. Cutoff points are taken at equal interval lengths in decreasing order starting at value 1 and are used for all k clusters for efficiency purposes. Having different cutoff points for each cluster or having them separated at different intervals would introduce a significant overhead to maintain the summary table G. Top outliers are inserted into a list in descending order according to distance to their nearest centroid; the outlier with smaller distance is deleted from the list. Outliers are inserted when cluster membership is determined.

In the example summary table of FIG. 3, the cutoff points are 0.7 (70%), 0.8 (80%), and 0.9 (90%). Thus, in the $C_j$ column of the summary table, for cluster 1 (j=1), the summary table indicates bread and milk as being purchased in at least 90% of input transactions, whereas jelly is indicated as being purchased in at least 80% of input transactions. The outlier (or odd transaction) in cluster 1 includes the following combination of items: {jelly, wine, notebook}. In other words, the frequency of transactions involving a purchase of all three of the above items is very low.

Because maintaining a summary table is not expensive, on-line (or real-time) updates of the summary table is feasible. The reasons that maintaining a summary table is not costly is set forth below:

(1) It is expected that only a few dimensions will appear in some rank in the summary table since the data sets are sparse. Ranking is performed using the cutoff points discussed above.

(2) Only high percentage ranks, closer to 1, are considered interesting. Thus, in the example depicted in FIG. 3, the high percentage ranks are specified by cutoff points at 70%, 80%, and 90%.

(3) All the cutoff points are separated at equal intervals, so that the rank for some dimension of $C_j$ can be determined in time O(1) (a minimum amount of time) using $C_{lj}$ as an index value (irregular intervals would make a linear search mandatory). The designation O(z) indicates that a particular task can be performed in z times a predefined unit of time; O(1) indicates that the particular task can be performed in one unit of time (which is the minimum amount of time for any task).

(4) The dimensions are sorted in lexicographical order by dimension index l inside each rank. The insertion of data into the summary table is done in almost time O(1) because only a few dimensions appear in the list and the data set D is assumed to be a sparse matrix. When the summary table G becomes populated as transactions are scanned it is likely some dimension of $C_j$ is already inserted and this can be determined in time O(log(|L|)) using a binary search. This would not be the case if all the cutoffs points spanned the [0, 1] interval because the d dimensions would have to be ranked.

(5) Outlier insertion is done in time almost O(1). This is the case because most input points are not outliers and it is assumed the desired number of outliers in the list is small.

V. Variants of the K-Means Clustering Algorithm

Several variants of the K-means clustering algorithm for binary data streams can be performed by the clustering module 100. Each variant of the K-means algorithm uses at least the sparse distance computation, and simplified sufficient statistics techniques discussed above. Optionally, each of the K-means variants also use the summary table discussed above. Empty clusters are re-seeded with the furthest neighbors of non-empty clusters. The re-seeding points are extracted from the outlier list stored in the summary table.

The input to each K-means clustering algorithm includes $D = \{T_1, T_2, \ldots, T_n\}$; the binary data points provided in transactions; and k (the desired number of clusters). The order of dimensions inside each transaction is not important. The order of transactions is not important as long as transactions do not come sorted by cluster. The output of the clustering algorithm include: the clustering model represented by the matrices C, R, and W; a partition of D into $D_1$, $D_2, \ldots, D_k$; a summary table G; and a measure of cluster quality q(R, W). Let the nearest neighbor function be defined as $$NN(t_i) = J.$$

such that $$\delta(t_i, C_j) \leq \delta(t_i, C_j).$$

Let ⊕ represent a sparse addition of vectors. Mathematically this addition is a normal vector addition, but for implementation purposes only non-zero entries are added. $M_j \oplus t_i$ has complexity $O(T)$. In a similar manner, the following operators are defined: sparse matrix division $\varnothing$, and sparse matrix subtraction $\ominus$, which only update matrix entries that change after reading a new point and assigning the new point to its nearest cluster. Empty clusters are re-seeded as follows. If $W_j=0$ then $C_j \leftarrow t_o$ (outlier transaction), where $t_o$ is a transaction such that $\delta(t_o, C_J) \geq \delta(t_i, C_j)$ for $j \neq J$ and $t_i \delta D_j$. The outlier $t_o$ is taken from the outlier list in the summary table G.

The variants of the K-means clustering algorithm include standard K-means, on-line K-means, scalable K-means, and incremental K-means. With on-line K-means, distances are used to compute cluster memberships (as discussed above) instead of weighted probabilities with Gaussian distributions. Initialization is based on a sample of k different points to seed C. The weights $W_j$ are initialized to $1/k$ to avoid early re-seeding. With the scalable K-means algorithm, initialization is based on a sample of k different points to seed C. The weights $W_j$ are initialized to $1/k$ to avoid early re-seeding.

Another variant of K-means is incremental K-means, which does not iterate until convergence. Initialization of incremental K-means is done using global statistics of D instead of using a sample of k transactions. Doing only one iteration could be a limitation with continuous (numeric) data, but it is reasonable with binary data. A difference with the on-line K-means algorithm is that the incremental K-means algorithm does not update C and $W_j$ every transaction, but every $n/L$ transactions. The incremental K-means algorithm touches the entirety of C and W each time the incremental K-means algorithm updates C and W. The setting for L is important to get a good solution. If $L=1$, then incremental K-means reduces to standard K-means stopped early after one iteration. On the other hand, if $L=n$, then incremental K-means reduces to on-line K-means. According to some embodiments, the setting for L is $L=\sqrt{n}$, which is a good setting for variety of reasons: (1) L is independent from d and k; (2) a larger data set size n accelerates convergence since as $n \rightarrow \infty$, $L \rightarrow \infty$, and (3) the number of points used to recompute centroids is the same as the total number of times they are updated.

Cluster centroids are initialized with small changes to the global mean of the data set. This mean-based initialization has the advantage of not requiring a pass over the data set to get different seeds for different runs because the global mean can be incrementally maintained. In the pseudo-code below (which sets forth the tasks performed by the incremental K-means algorithm), r represents a random number in $[0, 1]$, $\mu$ is the global mean, and $\sigma = \text{diag}[\sqrt{R_j}]$ represents a vector of global standard deviations. As $d \rightarrow \infty$, cluster centroids $C_j \rightarrow \mu$. This is based on the fact that the value of $\Sigma_{i=1}^n \delta(t_i, x)$ is minimized when $x = \mu$.

```
Input: {T₁, T₂, . . . , Tₙ} and k
Output: C, R, W and q(R, W)
FOR j = 1 TO k DO
    Cⱼ ← μ ± σr/d
    Nⱼ ← 0
    Mⱼ ← 0̄
    Wⱼ ← 1/k
END
L = √n
FOR i = 1 TO n DO
    j = NN(tᵢ)
    Mⱼ ⊕ tᵢ
    Nⱼ ← Nⱼ + 1
```

-continued

```
IF (i mod (n/L)) = 0 THEN
    Cⱼ ← Mⱼ/Nⱼ
    Rⱼ ← Cⱼ - CⱼᵗCⱼ
    Wⱼ = Nⱼ /i
    FOR j = 1 TO k DO
        IF Wⱼ = 0 THEN
            Cⱼ ← tₒ
        END
    END
END
END
```

In the incremental K-means clustering algorithm presented above in the pseudo code, the $C_j$, $N_j$, $M_j$, and $W_j$ parameters are initialized to various values (as indicated in the first FOR loop, for $j=1$ to k. Next, the parameter L is initialized to $\sqrt{n}$. In the second FOR loop, the n transactions are processed. Every $n/L$ transactions, the values of $C_j$, $R_j$, and $W_j$ are updated. Also, for clusters that are empty ($W_j=0$), the outlier transaction to is moved into $C_j$.

Each of the variants of the K-means algorithm introduced above reads each data point from disk just once. However, scalable K-means iterates in memory which can slow it down for an incoming flow of transactions. Moreover, since scalable K-means iterates until convergence, a threshold on the number of iterations is defined to avoid excessive time processing. On-line K-means and incremental K-means can keep up with the incoming flow of transactions since they do not iterate.

Instructions of the various software routines or modules discussed herein (such as the database software 102, which includes the clustering module 100, access modules 110, and parsing engine 108, and so forth) are executed on corresponding CPUs. The CPUs include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored on one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to a system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the present invention has been described with respect to a limited number of embodiments, those skilled in the art, having the benefit of this disclosure, will appreciate numerous modifications and variations there from. It is intended that the appended claims cover all such modifications and variations as fall within the true spirit and scope of this present invention.

What is claimed is:

1. An article comprising at least one storage medium containing instructions that when executed cause a system to:

perform a K-means clustering technique on input data;

perform sparse distance computations in the K-means clustering technique;

define clusters with the K-means clustering technique using sparse distance computations;

wherein the input data is a data set D including a plurality of d-dimensional transactions, each d-dimensional transaction having d attributes, wherein the data set D is to be divided into k clusters, and wherein the instructions when executed cause the system to further produce a d×k matrix C, each element $C_{lj}$ ($l$=1 to d, j=1 to k) of the matrix C containing a percentage indicating probability of occurrence of attribute 1 in cluster k;

compute statistics including a k×1 matrix M containing a sum of points per cluster, and a k×1 matrix N containing a number of points per cluster; and compute the matrix C based on M and N without using a matrix Q that contains a sum of squared points per cluster.

2. The article of claim 1, wherein the instructions when executed cause the system to further produce a summary table that summarizes a portion of C.

3. The article of claim 2, wherein the instructions when executed cause the system to further display the summary table.

4. The article of claim 2, wherein the instructions when executed cause the system to further produce outlier data for insertion into the summary table.

5. The article of claim 2, wherein the instructions when executed cause the system to further insert attributes of the data set D into the summary table that are associated with $C_{lj}$ being greater than a predetermined percentage.

6. The article of claim 5, wherein the instructions when executed cause the system to further define cutoff points, wherein inserting attributes of the data set D into the summary table comprises inserting attributes of the data set D into the summary table where attributes are associated with $C_{lj}$ within the ranges defined by the cutoff points.

7. A database system comprising:

a storage; and a controller coupled to the storage to:

receive input transactions;

determine clusters of data from the input transactions;

compute data structures defining the clusters based on first and second statistics, the first statistic containing sums of points in corresponding clusters, and the second statistic containing numbers of points in corresponding clusters, wherein computing the data structures defining the clusters is performed based on the first and second statistics without using a third statistic that contains sums of squared points in corresponding clusters;

wherein the input transactions are part of a data set D including a plurality of d-dimensional transactions, each d-dimensional transaction having d attributes, wherein the controller is adapted to divide the data set D into k clusters, and wherein the data structures comprise a d×k matrix C, each element $C_{lj}$ ($l$=1 to d, j=1 to k) of matrix C containing a percentage indicating probability of occurrence of attribute 1 in cluster k;

compute statistics including a k×1 matrix M containing a sum of points per cluster, and a k×1 matrix N containing a number of points per cluster; and compute the matrix C based on M and N without using a matrix Q that contains a sum of squared points per cluster.

8. A method of clustering data, comprising the steps of:

performing a K-means clustering technique on input data;

performing sparse distance computations in the K-means clustering technique;

defining clusters with the K-means clustering technique using sparse distance computations;

wherein the input data is a data set D including a plurality of d-dimensional transactions, each d-dimensional transaction having d attributes, wherein the data set D is to be divided into k clusters, and wherein the instructions when executed cause the system to further produce a d×k matrix C, each element $C_{lj}$ ($l$=1 to d, j=1 to k) of the matrix C containing a percentage indicating probability of occurrence of attribute 1 in cluster k;

computing statistics including a k×1 matrix M containing a sum of points per cluster and a k×1 matrix N containing a number of points per cluster; and computing the matrix C based on M and N without using a matrix Q that contains a sum of squared points per cluster.

9. The method according to claim 8, further comprising the step of:

producing a summary table that summarizes a portion of matrix C.

10. The method according to claim 9, further comprising the step of:

displaying the summary table.

11. The method according to claim 9, further comprising the step of:

producing outlier data for insertion into the summary table.

12. The method according to claim 9, further comprising the step of:

inserting attributes of the data set D into the summary table that are associated with $C_{lj}$ being greater than a predetermined percentage.

13. The method according to claim 12, further comprising the steps of defining cutoff points, and wherein said step of inserting attributes of the data set D into the summary table comprises inserting attributes of the data set D into the summary table where attributes are associated with $C_{cj}$ within the ranges defined by the cutoff points.

* * * * *

UNITED STATES PATENT AND TRADEMARK OFFICE
CERTIFICATE OF CORRECTION

PATENT NO.        : 7,349,914 B1                                           Page 1 of 1
APPLICATION NO.   : 10/838475
DATED             : March 25, 2008
INVENTOR(S)       : C. Ordonez It is certified that error appears in the above-identified patent and that said Letters Patent is hereby corrected as shown below:

Column 12, Line 8, after attribute delete "1" and insert -- $\ell$ --.

Signed and Sealed this

Twenty-fourth Day of March, 2009

JOHN DOLL
*Acting Director of the United States Patent and Trademark Office*